Oct. 23, 1973  F. A. KARR  3,767,829
METHOD FOR WARMING CARBONATED BEVERAGES IN SEALED CONTAINERS
Filed May 4, 1971  4 Sheets-Sheet 1

INVENTOR.
Fred A. Karr
BY Flehr, Hohbach, Test, Albritton & Herbert
Attorneys

Oct. 23, 1973   F. A. KARR   3,767,829
METHOD FOR WARMING CARBONATED BEVERAGES IN SEALED CONTAINERS
Filed May 4, 1971   4 Sheets-Sheet 2

INVENTOR.
Fred A. Karr
BY Flehr, Hohbach, Test,
Albritton & Herbert
Attorneys

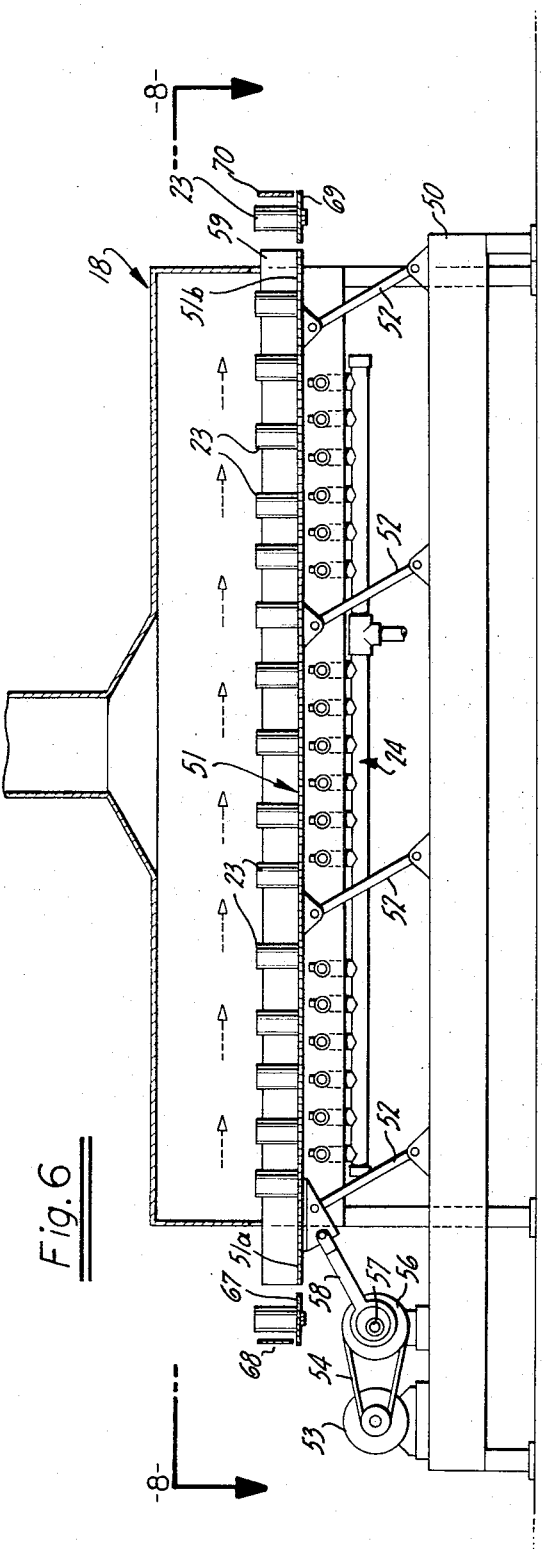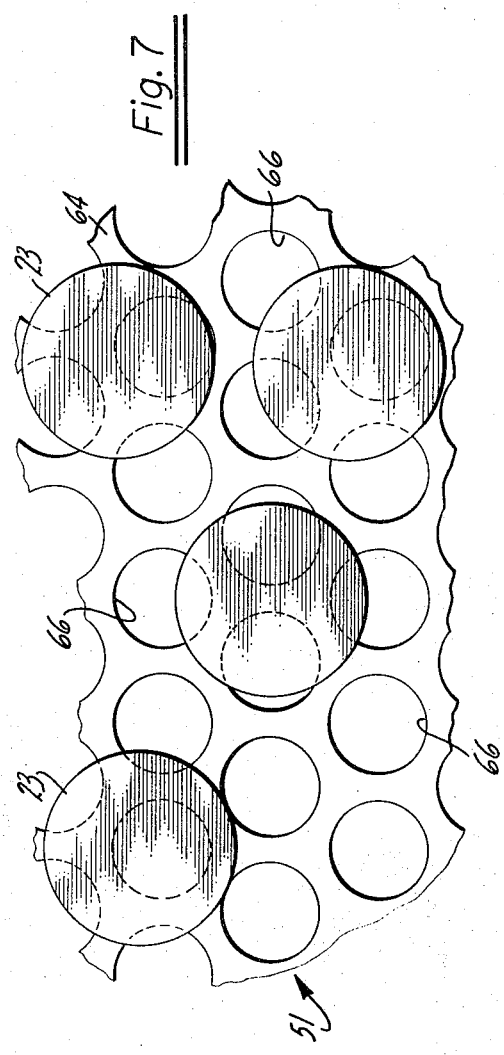

Oct. 23, 1973  F. A. KARR  3,767,829
METHOD FOR WARMING CARBONATED BEVERAGES IN SEALED CONTAINERS
Filed May 4, 1971  4 Sheets-Sheet 4

INVENTOR.
Fred A. Karr
BY
Flehr, Hohbach, Test
Albritton & Herbert
Attorneys

United States Patent Office 3,767,829
Patented Oct. 23, 1973

3,767,829
METHOD FOR WARMING CARBONATED
BEVERAGES IN SEALED CONTAINERS
Fred A. Karr, Redwood City, Calif., assignor to Shasta
Beverages, Hayward, Calif.
Filed May 4, 1971, Ser. No. 140,140
Int. Cl. A23l 3/02; C12h 1/20
U.S. Cl. 426—405
12 Claims

ABSTRACT OF THE DISCLOSURE

A method for the continuous heating of the contents of sealed containers (e.g. metal cans or glass bottles) of carbonated beverages (e.g. beer and soft drinks) comprising conveying the sealed containers on (a) an endless perforate belt or (b) a vibratory conveyor deck over an elongated dry heat source so that the temperature of the beverage is increased while permitting the head space to remain relatively cool. An apparatus for performing that method including heat sources of the infrared heat-radiating type or of the open flame type. The method and apparatus are especially useful (a) to minimize condensation on the exterior of freshly-filled cold beverages and (b) for the rapid heating of beer to pasteurizing temperatures.

BACKGROUND OF THE INVENTION

For economical operation of a bottling or canning plant for carbonated beverages such as soft drinks, beer and the like, the containers (bottles or cans) are packaged fairly soon after filling. The beverage should be cold (e.g. about 32–34° F.) during filling (and seaming for cans) to avoid excessive foaming and consequent loss of carbonation. Carbon dioxide gas escaping from the beverage forms a gaseous head space pressure in the sealed can. If the cold containers were directly packaged in cases for shipment at such low temperatures, condensation would occur on the same with the resulting water saturating and weakening the case. Furthermore, with metal can containers, the condensing water causes rusting.

To eliminate such condensation, it is conventional to warm cold containers, filled with carbonated beverage, prior to packaging. In one type of container warmer, hot water is sprayed from nozzles onto the tops of closed packed containers. For metal cans, the hot water fills the recess tops and runs down the sides of the cans into a water supply tank. Thus, the main heating surface is the exposed tops of the cans which are insulated from the beverage by the aforementioned gaseous head space, which tends to overheat. Since the carbon dioxide in gaseous form is urged to expand in the overheated head space, a high pressure area is formed which could rupture the cans. To avoid this, the temperature of the warmer is limited to a low value with the necessity of a consequent long contact time and massive equipment. Another disadvantage of this type of warmer for cans is that at the exit the cans are wet with water, especially the recessed can lid retains a small pool. This water must be removed to avoid corrosion of the conservors and packaging equipment. In one removal technique, large (50 to 75 h.p.) air blowers are used. In another technique, rotary can dryers that roll the cans against a felt surface under vacuum are used. Other disadvantages include excessive downtime and frequent maintenance of the moving parts due to the corrosive effects of the water. Furthermore, the water must be frequently sterilized and drained for sanitation to avoid algae and bacteria growth.

Another warming operation, pasteurization, is applicable to containers filled with beer or other carbonated beverages requiring such treatment. The above type of hot water spray warming apparatus conventionally has been employed for this purpose. In addition to the aforedescribed deficiencies, hot water spray pasteurizing requires on the order of 10–20 minutes or more to elevate the beer temperature from ambient to pasteurizing temperatures (e.g. 140–145° F.). Thereafter the beer is conventionally held at pasteurizing temperatures for about 20 minutes. This long heating period can impart an overcooked taste to the beer. Also, massive equipment is required for such a long heat cycle. It would be desirable to heat the beer to pasteurizing temperature in a shorter time period than is available with hot water spray techniques. If the heating cycle were fast enough, the beer could be "flash pasteurized," i.e. held at higher temperatures (e.g. 160° F.) for a shorter time (e.g. 10 minutes) without detrimental effects on the beer flavor.

In a different, apparently abandoned proposal for a bottle warmer, infrared heat would be supplied at the sides of a moving conveyor line of transport bottles containing carbonated beverage. One deficiency is that it can only be used for transparent glass bottles which transmit infrared radiation. Another problem is that, since the heat is supplied to the sides of the bottles, the gaseous head space therein is exposed to heat at the same rate as the liquid beverage and so tends to overheat with a resulting danger of exploding bottles or blowing off of bottle caps.

SUMMARY OF THE INVENTION AND OBJECTS

A method and apparatus are provided for continuously heating to ambient temperatures the contents of a plurality of sealed containers (e.g. bottles or cans) filled with carbonated beverage (e.g. beer and carbonated soft drinks). The method is useful as applied to containers freshly filled with cold carbonated beverage to avoid the formation of condensation on the containers. The method is also applicable to heating a beverage to pasteurizing temperatures from either cold filling or room temperature.

One embodiment of the apparatus include a conveyor formed of an endless perforate heat-resistive conveyor having upper and lower runs, and an elongated open-bottomed tunnel oven disposed above said upper run having side walls adapted to retain beverage containers carried by said upper run. Elongated stationary, dry-heating means disposed between upper and lower conveyor runs below the oven means are provided to supply a plurality of beverage containers to the upstream end of said upper run for movement through said oven. In this manner, the underside of the beverage containers are preferentially heated. Control means are associated with the heating means capable of adjusting the heat intensity along the container path of travel. One embodiment of the dry heater means includes a plurality of infrared heater elements transverse to the direction of travel of the conveyor with each element including an upper heat radiating surface and air-fuel gas mixture feed. Another embodiment of the dry heating means includes a plurality of spaced-apart rows of open-flame natural draft burners capable of impinging upon the underside of the beverage containers.

In another embodiment of the apparatus, the conveyor is of vibratory type. The upstream end of the deck of the vibratory conveyor is disposed proximate and transverse to an infeed conveyor and the discharge end of the deck is proximate and transverse to a discharge conveyor so that the containers are conveyed directly to and from the conveyor deck without the interposition of a deadplate.

According to the process, the sealed containers filled with carbonated beverages are moved on a conveyor of one of the above types over a dry heat source so that the dry heat emitted therefrom impinges upon the underside of the containers to heat the carbonated beverage therein in progression proceeding from the bottom toward the top of the containers so that an elevation of the temperature of the beverage is induced while permitting the head space to remain relatively cool. Heating the beverage before the gaseous head space reduces the danger of superheating the gaseous head space and also eliminates the requirement of transmitting heat through the poorly-conductive gaseous head space in order to warm the beverage. The containers on a vibratory conveyor are vibrated sufficiently to increase heat transfer by convection from the bottom toward the top of the container.

In general, it is an object of the present invention to provide a method and apparatus for warming carbonated beverage in containers of either the glass bottle or metal can type to avoid the formation of condensation on the containers.

It is another object of the invention to provide a method and apparatus elevating the temperature of beer in a container of the above type to a value at which pasteurization can occur and which also overcomes the disadvantages of the prior art.

Additional objects and features of the invention will appear from the following description in which the preferred embodiment is set forth in conjunction with the accompanying drawings.

BRIEF DESCRIPTION OF THE DRAWINGS

FIG. 6 is a side vertical cross-sectional view taken on the longitudinal center line of the oven and illustrating a vibratory conveyor.

FIG. 7 is a top enlarged view of a portion of one vibratory conveyor deck.

DETAILED DESCRIPTION OF THE PREFERRED EMBODIMENTS

Figure 1:
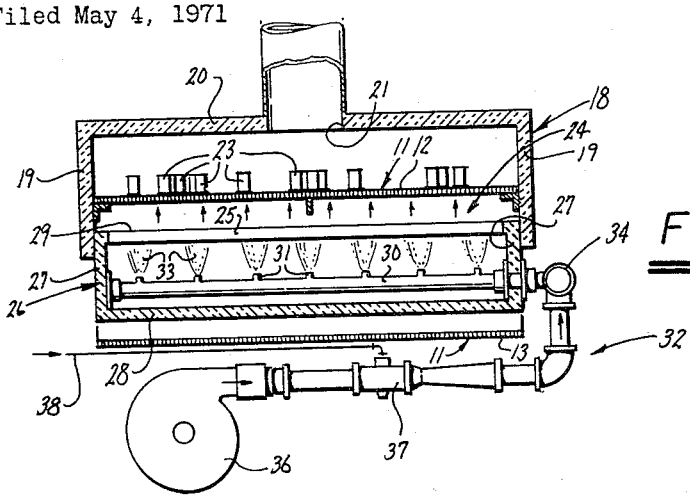
FIG. 1 is an end vertical cross-sectional view through an oven according to the invention with an infrared burner.
Figure 2:
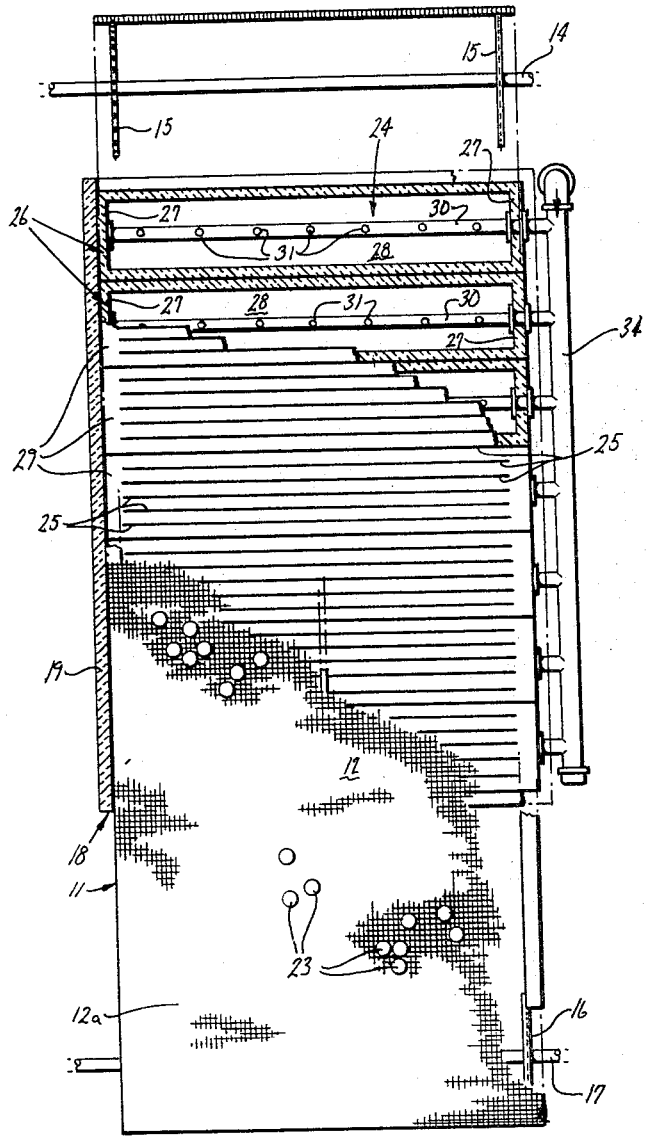
FIG. 2 is a top cross-sectional view of the device of FIG. 1 partially broken away.

The process of the present invention can be best illustrated by first describing the apparatus of the drawings. Referring to FIGS. 1 and 2, one embodiment of a warmer apparatus according to the present invention includes an endless, perforate conveyor 11, suitably of a heat-resistive material, such as stainless steel mesh, having an upper run 12 and a lower run 13. One end of conveyor 11 is mounted to drive shaft 14 on drive sprockets 15 supplied with power from a suitable source (not shown) and the other end of the conveyor passes over idler sprockets 16 mounted on shaft 17. Rotatable shafts 14 and 17 are suitably journaled into bearings of a frame (not shown).

An elongated open-bottomed tunnel oven 18 is disposed above upper run 12 and includes upstanding side walls 19 and top wall 20 which has an opening to accommodate vent 21 for hot effluent gases from the oven. Side walls 19 may be of any suitable material, such as refractory brick, which retains heat within the oven. Top wall 20 is preferably spaced at a substantial distance above upper run 12 to avoid substantial reflection of heat rising past the containers from the top wall onto the top of the containers which could cause overheating of the gaseous head space. As a further precaution to prevent this, the top wall may be lined with a heat absorptive material, such as asbestos.

Oven 18 may contain suitable brackets 22 to prevent upper run 12 from sagging in the central portion of its path of travel.

Means are provided for supplying a plurality of the beverage containers 23 to the upstream end 12a of upper run 12. Such means may be the manual placement of the containers or may be another conveyor system (not shown). In either event, the heat source is most economically utilized by supplying the containers in a compact grouping. As shown in the drawing, the containers are suitably metal cans, as of the aluminum or tin-coated type. Glass bottle containers may also be employed.

An elongated stationary dry-heating means 24 is disposed between the upper and lower conveyor runs 12 and 13 below oven 18 for preferentially heating the underside of containers 23. Referring to FIGS. 1 and 2, heating means 24 comprises a plurality of enclosed infrared heating elements 26 transverse to the direction of travel of the conveyor. Each heating element includes side walls 27, lower wall 28 and upper wall 29. Walls 28 and 29 may be of any suitable material which is resistive to the heat generated within the element, such as refractory brick or cast iron. Each upper wall 29 containing a series of transverse slits 25 for effluent gases emitted from the heating element may be of suitable heat radiating material, such as ceramic, which emits substantial infrared heat from its top surface in response to heat supplied to its lower surface from within each element 26. Each heating element is provided with a suitable heat source, such as transverse pipe 30 having a series of spaced-apart nozzles 31 which are supplied with an air-fuel gas mixture through supply means 32 for production of a series of flames 33 to heat the lower surface of upper wall 29. Supply means 32, of the forced air induction type, includes a burner manifold 34 in communication with each pipe 30 and which is fed with an air-fuel gas mixture. Compressed air is forced by means of blower 36 into mixing section 38. An appropriate fuel gas, such as natural gas, is also supplied to mixing section 37 via gas line 38. This mixture is then directed through manifold 34 into the pipe nozzles 31 and is ignited to form flames 33.

Suitable control means (not shown) are associated with each heating element capable of adjusting the heat intensity to different values in different elements. For example, valves may be provided for each pipe 30 to adjust the quantity of air-fuel gas mixture fed to pipes 30 with a corresponding change in the heat output of each heating element.

One method for employing the apparatus illustrated in FIGS. 1 and is the warming of containers filled with cold carbonated beverage such as beer or carbonated soft drinks for the purpose of avoiding the formation of condensation on the exterior of the containers. The process will be described with respect to metal can containers and carbonated soft drink as the beverage, although it should be understood that glass bottle containers or beer as the beverage may also be used. Syrup and prechilled water are mixed and injected with carbon dioxide to form the soft drink for filling the cans. This filling is performed at a temperature of about 32–34° F. to prevent excessive foaming during the filling and subsequent seaming of the lid onto the can. The cans still at a low temperature, on the order of 38–48° F., are fed by suitable conveyor means to upstream and 12a of the upper conveyor run. Alternatively, these cans could be manually placed on the upper run. For economy, the cans may form an almost continuous side-by-side network on the upper run retained in place by oven side walls 27. Such cans proceed over heater element upper walls 29 and absorb the heat emitting from said upper walls in response to flames 33. As discussed previously, the temperature of upper walls 29 of each heater element may be adjusted according to a desired optimum overall heating pattern. The heat which impinges upon the underside of the containers heats the carbonated beverage therein in a progression proceeding from the bottom toward the top of the containers. This allows the heat space to remain relatively cool and so avoids any tendency to superheat with the concomitant danger of explosion. Furthermore, since the liquid beverage is substantially better conductor of heat than the gaseous head space, heating from the bottom toward the top of the container provides an optimum efficiency for a given amount of heat input supplied by heating means 24.

The beverage is heated from a temperature of about 38–48° F. to a desired final temperature on the order of 60–70° F. It has been found that a device of the aforementioned type is capable of heating at a rate of at least ½° F. per second for a total elevation of between 15 and 35° F. without overheating the gaseous head space. In fact, a typical average pressure of heated carbonated beverage removed from the device of the invention is less than fifty pounds per square inch.

Another method for utilizing the apparatus of FIGS. 1 and 2 is for elevating the temperature of beer from either the cold temperature of filling or ambient room temperature to a value sufficient for pasteurization (e.g. 140–145° F.). Conventionally the beer is held at these temperatures for about 20 minutes prior to cooling. The beer may be carbonated either by totally natural fermentation or by means of an auxiliary extraneous supply of carbon dioxide. Either type of beer is conventionally filled into the containers at similar cold temperatures to that of soft drinks (e.g. 38–48° F.) for the same purpose, the prevention of excessive foaming. The aforementioned general heating procedure may be employed except that of the heat transfer to the beer is increased to provide a higher temperature elevation. Typically, this may be accomplished by reducing the container conveyance rate, increasing the heat output from the burners, or lengthening the furnace.

In accordance with this method, the beer temperature may be elevated from the cold filling temperatures to conventional pasteurizing temperatures of 140–145° F. in three minutes or less in contrast to times of ten to twenty minutes by conventional hot water spray heating. Accordingly, the overall process time is substantially shortened leading to greater economy. This shortened time also minimizes the chances for the final beer product acquiring an undesirable cooked taste. This rapid temperature elevation renders the process particularly well adapted for heating to flash pasteurization temperatures (e.g. 160° F.) and for short pasteurization holding periods (e.g. 10 minutes) without producing a cooked taste. This further reduction in the processing time provides additional processing efficiency.

Of course, the process may also be employed to elevate the beer temperature from ambient room temperatures other than cold filling temperatures to pasteurizing temperatures in the same manner.

Figure 3:
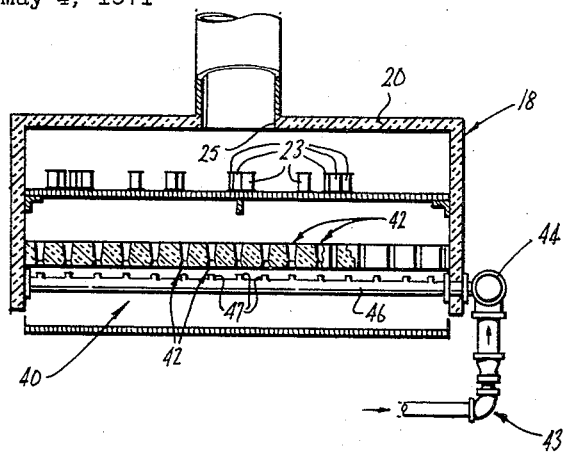
FIG. 3 is an end, vertical, cross-sectional view of an oven according to the invention with natural induction open burners.
Figure 4:
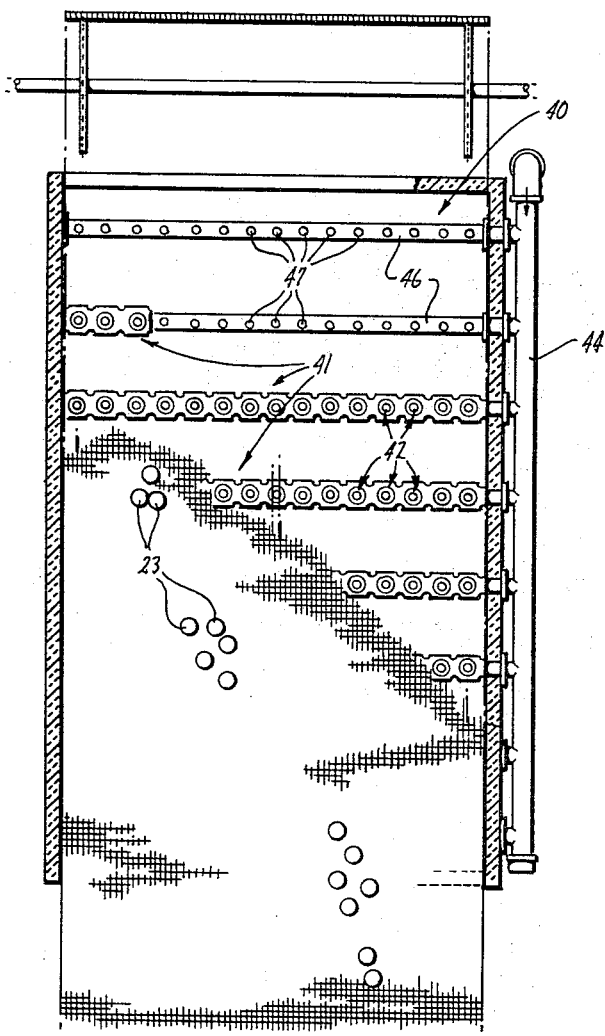
FIG. 4 is a top cross-sectional view of the device of FIG. 3 partially broken away.
Figure 5:
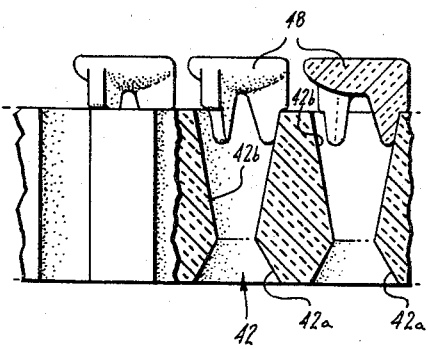
FIG. 5 is an enlarged view of a burner portion of FIG. 3 showing optional platforms for radiating heat.

FIGS. 3–5 illustrate another embodiment according to the invention in which the heat is supplied from heating means comprising open flame natural draft burners. Heating means 40 includes a plurality of transverse spaced-apart rows 41 each containing a series of individual natural draft burners 42. Burners 42 are preferably of the venturi type having a lower conical portion 42a and an upper facing conical portion 42b of longer length and shallower slope. Burners 42 may be formed of a material which generates residual infrared radiant heat, such as cast iron or ceramic. Supply means 43 is provided to direct appropriate fuel gas, such as natural gas from a gas main, to a position below each of burners 42. Such means includes a manifold 44 which directs the fuel gas to individual pipes 46 containing a series of nozzles 47 directly below each burner. The venturi effect is created by the shape of each burner 42 so that the gas supplied thereto is accelerated to mix with the surrounding air to provide a fuel mixture by natural induction. It is noted that this arrangement eliminated the air blower of the embodiment of FIG. 1 and so is relatively inexpensive to install and operate. As with the embodiment of FIGS. 1 and 2, control means, not shown, such as individual valves, are associated with each burner row 41 for independent heat adjustment. Burner rows 41 are spaced apart to avoid an overheating of the liquid. This is advisable because direct flame impingement is a more rapid process than infrared burners.

Referring to FIG. 5, a particular burner embodiment is shown in which optional platform tops 48, suitably of ceramic material, are inserted into burner portion 42b in a manner to permit the bypass of flame emitting therefrom around the periphery of the tops. In this manner, the underside of containers 23, are heated by a combination of conductive heat provided by the flame passing around the periphery of tops 48 and by radiant infrared heat emitted from the upper surface of the element.

The embodiments of FIGS. 3 and 4 are substantially the same as the embodiment of FIGS. 1 and 2 except for the above-described differences between heating means 24 and 40. The same portions of each embodiment are accorded the same numbers and the description of such parts with respect to the former embodiment applies to the latter embodiment.

The operation of the embodiment of FIGS. 3–5 differs from that of FIGS. 1 and 2 only in the manner of supplying heat. The flames from each burner 42 may be adjusted to impinge directly upon the undersurface of containers 23, conveyed along upper run 12, or not depending upon the desired heating effects. If tops 48 are employed, annular flames are formed which may be similarly adjusted. The annular flame configuration formed by tops 48 functions to prevent formation of concentrated heat points that might otherwise occur. Tops 48 also provide infrared heat radiation which combines with the conductive heat of the flame in warming the containers.

Referring to FIGS. 6 and 7, an apparatus is disclosed which is similar to the one illustrated in FIGS. 1 and 2 except that a vibratory, rather than a belt, conveyor system is employed for moving the containers through the warming oven. Like parts in the illustrated apparati will be denoted with like numbers. The vibratory conveyor system includes a stationary counterweighted support base 50 interconnected to vibratory conveyor deck 51 by four pivotally mounted flat-spring support legs 52. The vibratory deck 51 is actuated by a positive action eccentric drive means including a motor 53 linked to a drive belt 54 which, in turn, causes the rotation of pulley 56 and concentric shaft 57. An arm 58 is eccentrically mounted at one end to shaft 57 and is suitably mounted at its other end to the lower portion of the upstream end 51a of deck 51. Motor 53 rotates shaft 57 so that eccentrically mounted arm 58 causes a periodic forward and upward movement of deck 51 as illustrated by arrow A, pivoting legs 52 clockwise to a more upright position and then counterclockwise to a less upright position to complete the cycle. In this manner, the containers on the deck move in a straight line path during oscillation. One conveyor of the above type is produced by FMC Corporation, Ling-Belt Division, under the designation "Flexmount." Exemplary of other types of positive action vibratory conveyor systems sold by Link-Belt Division which may be employed are designated as "Coilmount" and "Torqmount." Under certain circumstances the spring-mounted trough may be depressed and quickly released to oscillate at its natural frequency until stopped by frictional forces without the necessity for positive action drive.

The oscillation of the vibratory conveyor may be modified for any particular desired throughput in the can warmer. It has been determined that a relatively short stroke of arm 58, on the order of ¼ to ½ inch, would provide adequate performance for the aforementioned can line speeds. Factors other than the length of stroke which determine the rate of can travel on the vibratory conveyor are the stroke speed of arm 58 and the angle of decline to the discharge end 51b of deck 51. Although not necessary in all circumstances, this decline angle assists the flow of containers along the conveyor.

Conveyor deck 51 includes side walls 59 and 60 along each side to retain the beverage containers on the deck. As illustrated in FIG. 7, one form of the supporting platform conveyor deck 51 includes a plurality of spaced-apart longitudinal rods 61 rigidly supported from below by spaced-apart crossbars 62 journaled at opposite ends in walls 59 and 60. The spaces or openings between adjacent rod 61 are selected to provide the desired heat transfer from dry heating means 24 to containers 23. The deck 51 is formed of a heat resistive material, such as stainless steel, to withstand the heat emitted within the oven over an extended period of time.

Figure 8:
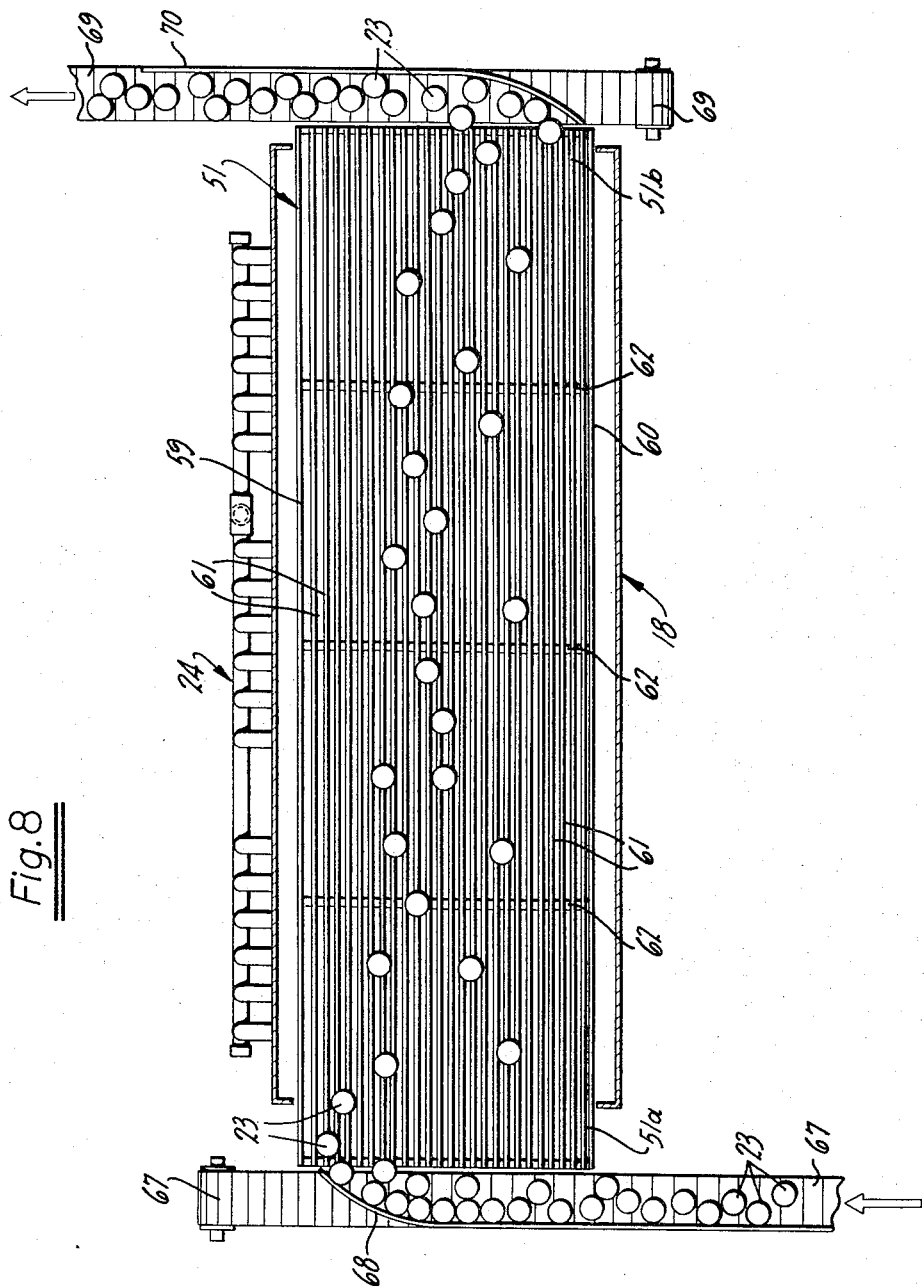
FIG. 8 is a top cross-sectional view of the device in FIG. 6 taken along the line 8—8.
Figure 1:
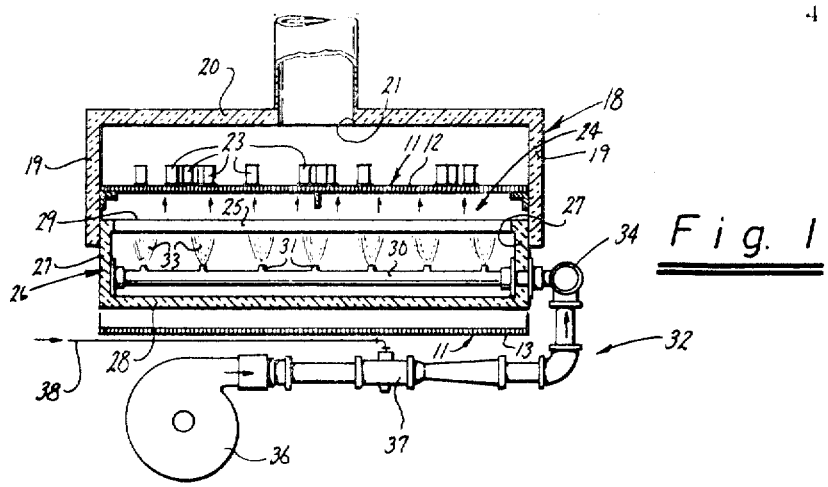
Figure 2:
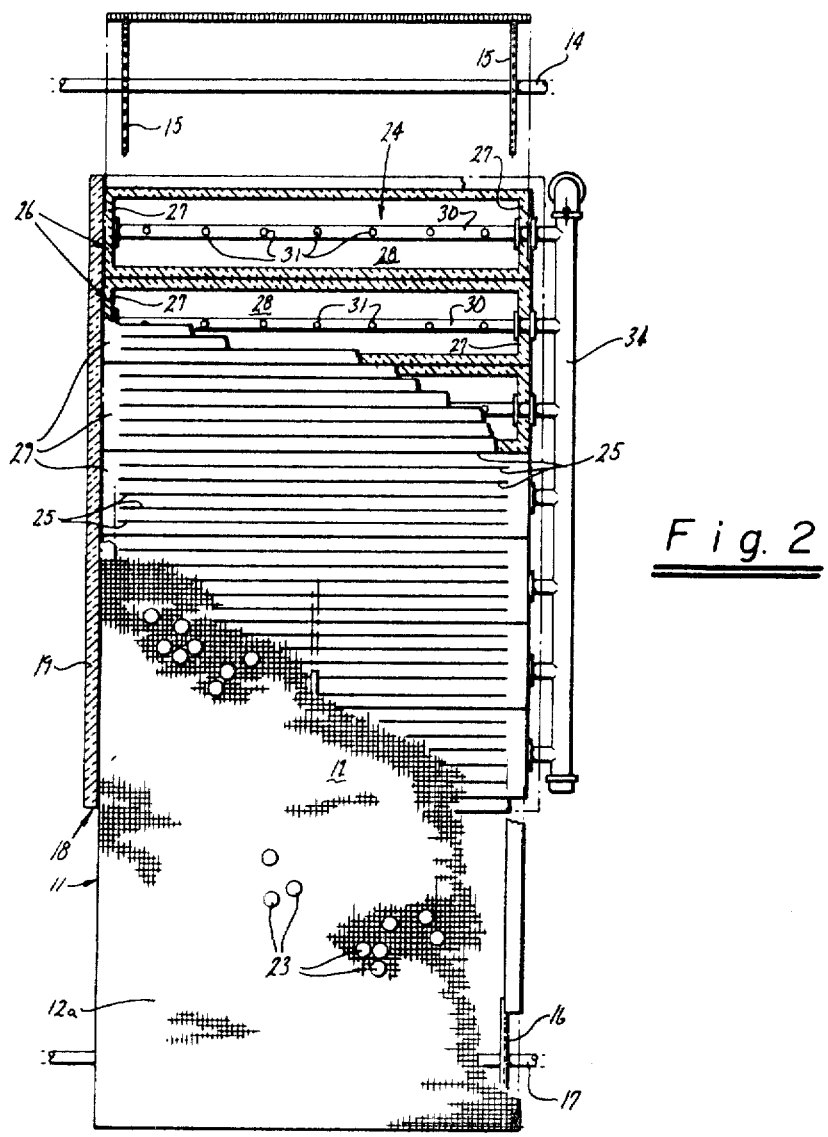
Figure 3:
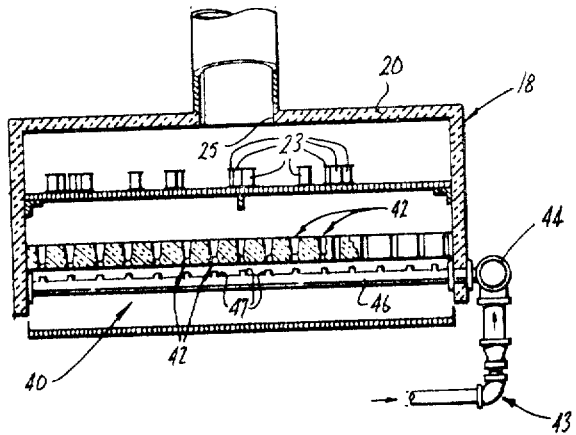
Figure 4:
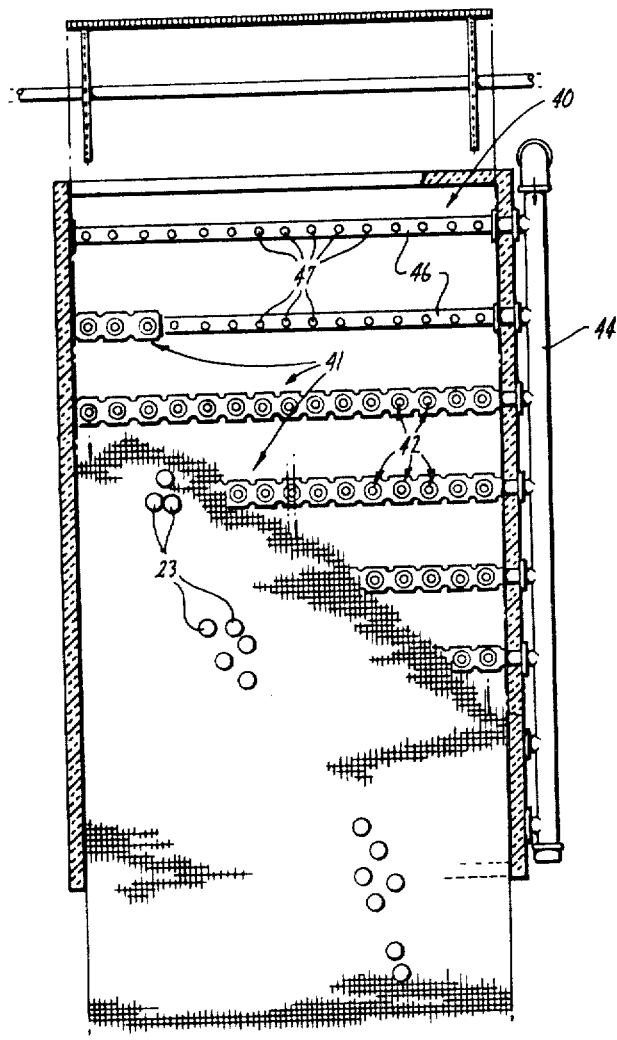
Figure 5:
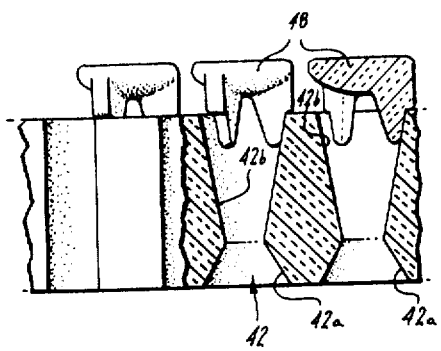

Referring to FIG. 8, another embodiment of the supporting platform of deck 51 is illustrated which comprises a flat plate 64 of heat-resistive material such as stainless steel and in which the spaced heat transfer openings comprise a plurality of equally spaced-apart, circular holes 66. The equal spacing among the holes 66 serve to transmit equal amounts of heat from the stationary dry heating means 24 to containers 23. The amount of open space per unit area may be selected to provide the desired amount of heat transfer.

An infeed conveyor 67 suitably of an endless belt-type is disposed transverse to and closely proximate to the upstream end 51a of deck 51. Conveyor 67 may be a single or a multiple container feed depending upon the desired capacity for the remainder of the system. A curved guide member 68 provide above conveyor 67 for direct transfer of the containers to deck 51 to form a compact grouping across the deck by the urging of the continuous stream of containers on infeed conveyor 67.

A discharge conveyor 69, similar in construction and positioning to that of infeed conveyor 67 is located proximate to and transverse to the discharge end 51b of the deck 51 so that the containers are transferred directly between conveyors. A guide member 70, similar to guide member 68, is provided above discharge conveyor 69 to provide a smooth transition of the containers upon a change of direction.

There are a certain number of advantages which are obtained by the use of a vibratory conveyor system in the warming oven rather than an endless belt conveyor system. In the latter conveyor system, intermediate dead plate platforms must be mounted between deck 51 and conveyors 67 and 69 to bridge the gap between the belt at the downward curves of each drum pulley and the infeed and discharge conveyors. During a temporary line stoppage, containers will remain stationary on both dead plates until the next startup. Also, the dead plates must be located at a substantial distance from both ends of the oven to prevent such stationary cans from overheating and buckling. This requires additional space for the equipment. For example, each dead plate may be located two feet or more from the end of the oven. Even so, the safest procedure during each production line stoppage is to manually remove the containers from the dead plate. This, of course, requires the presence of an operator and is subject to human error.

The vibratory deck 51 requires no dead plate to bridge a drum pulley gas and so may be positioned sufficiently close to the infeed and discharge conveyors 68 and 70 for direct transfer of the containers. This avoids the aforementioned problems of a belt conveyor and enables the construction of a compact warming system.

A sufficient clearance is provided between the vibratory deck 51 and the infeed and discharge conveyors 68 and 70 to prevent contact of the same by the oscillating motion of the vibratory deck to thereby minimize wear and fatigue. This clearance also permits adjustment of the oscillating stroke length. To permit smooth transfer of the cans from the infeed conveyor onto the vibratory deck without catching of the bottom chimes of the can on the leading edge of the ladder, the infeed conveyor is mounted a short distance, on the order of 1/16 inch, above the vibratory conveyor at its highest oscillation point. In like manner, the discharge end 51b of the vibratory deck 51 is mounted so that at its highest elevation, the deck is a similar short distance above discharge conveyor 69.

A vibratory conveyor employed during heating has a further advantage in that the containers are vibrated to circulate the carbonated beverage within the containers to increase the heat transfer by convection from the bottom toward the top of the containers. Also, the danger of overheating a static gaseous head space from overhead heating is considerably reduced since the beverage continuously splashes against the top of the container to remove the static nature of the head space.

A specific apparatus of the type illustrated with respect to FIGS. 1 and 2 utilized for heating cold soft drink in cans to avoid condensation is as follows: seven heater elements 26 about eight inches wide with ceramic tops were provided in an oven with brick side walls and an asbestos top wall 14 inches above the upper run of the conveyor. In a first run, 600 metal cans per minute freshly filled with cold soft drink were conveyed over the heater elements at a sufficient speed for a resident warming time in the oven of thirty (30) seconds. The infrared burners were adjusted, numbering from the upstream to the downstream side of the oven, as follows: Number one: 1/4 open; Numbers two–six: 1/2 open; and Number seven: closed.

The above apparatus was used to heat metal cans to avoid condensation. Prior to can warming, the average can pressure was 21 pounds without shaking and 23 pounds with shaking. The average temperature at the top of the cans in the oven was 475° F. After warming, the average pressure was 36.5 pounds without shaking and 39.9 pounds with shaking. The temperature of the carbonated beverage was increased from 42 to 62° F. in the thirty-second resident time.

In a second run through the same apparatus, the burners were readjusted as follows: Numbers one, three and five: 3/4 open; Numbers two, four and six: closed; Number seven: 1/2 open. Prior to warming, the average can pressure was 21 pounds without shaking and 22 pounds with shaking. After warming, the average can pressure was 36.5 pounds without shaking and 39.9 pounds with shaking. The average temperature for the tops of the cans was 400° F. For residence time of thirty-five seconds, the beverage was raised from an average temperature of 40.75° F. to 63.75° F.

The pressure in the containers leaving the warming unit does not exceed the true carbonated pressure at a given temperature. This indicates that, according to the process of this invention, there is no false excessive pressure in the gaseous head space caused by overheating.

In a comparison of the results of the two runs, it is seen that the average temperature of the cans was increased by 1.75° F. by increasing the heating time and closing alternate burners. This combination lowered the temperature of the tops of the cans from 475° F. to 400° F. and so is in a safer range of temperatures with respect to any possible superheating of head space.

It is apparent from the foregoing that an improved method and means have been provided for warming containers of carbonated beverages either to avoid condensation or, with beer as the carbonated beverage, for pasteurization. Although the invention has been described primarily with respect to warming carbonated beverages in metal cans, it is to be understood that containers formed of glass or plastic or a combination thereof with metal may be employed with an appropriate adjustment of heating conditions. It is also to be understood that the method of the present invention is applicable to the warming of any carbonated beverage from a lower to a higher temperature for any purpose and at any time other than directly

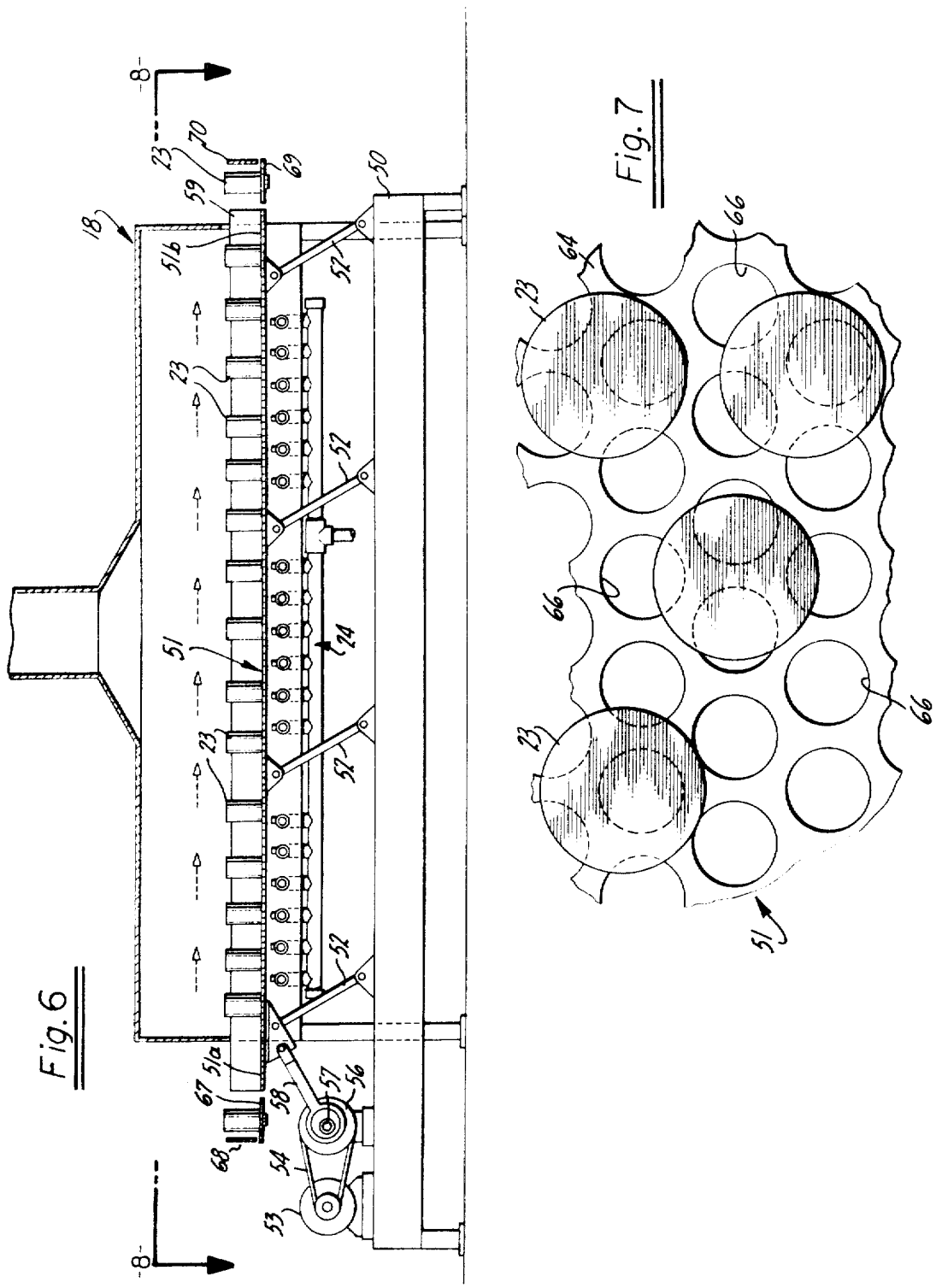

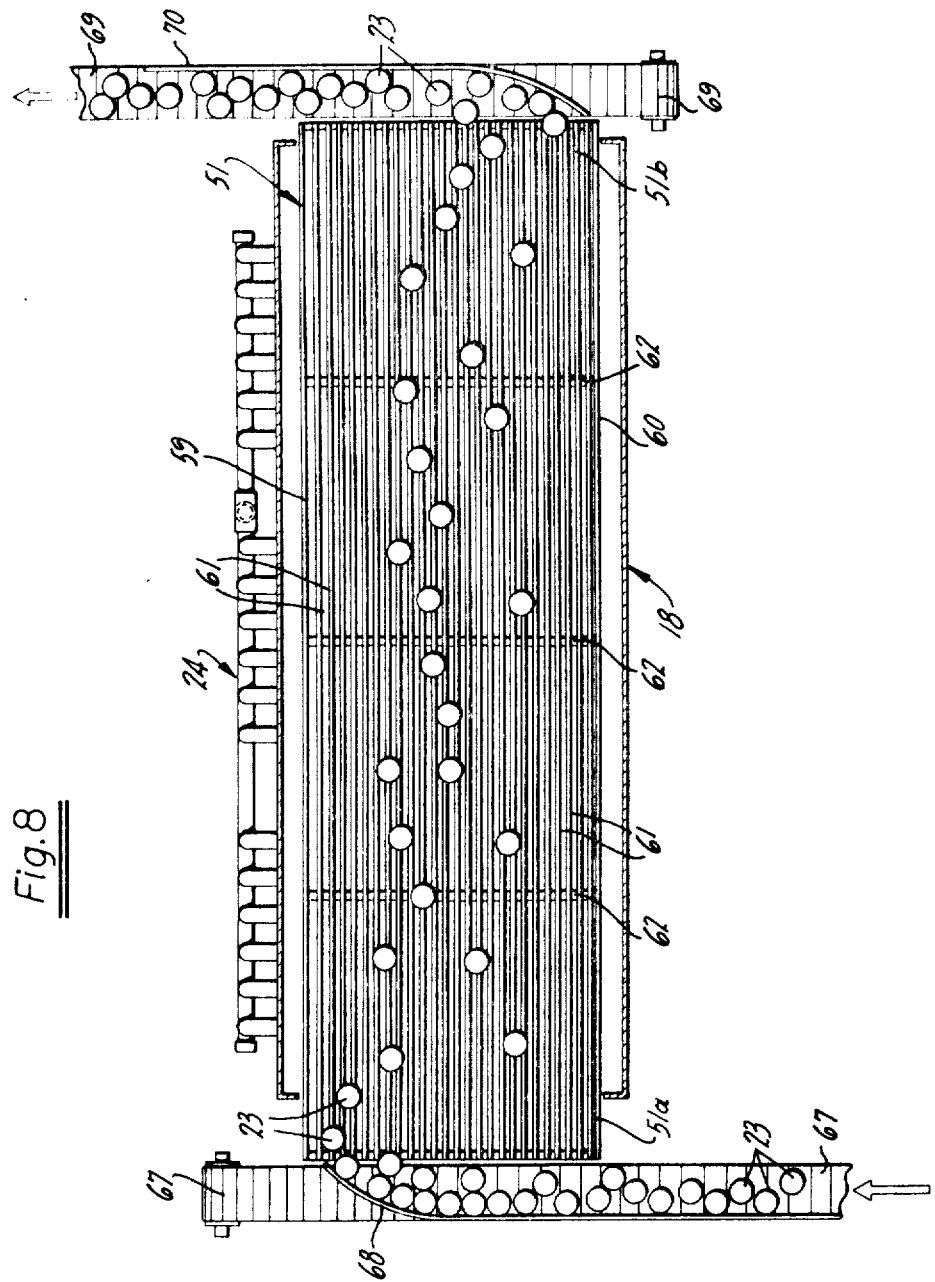

I claim:

1. In a continuous method for rapidly heating the contents of a plurality of sealed containers filled with beer, soft drinks or other carbonated beverages, the steps of providing an open heated conveyor passing over a stationary extended flame heat source, feeding to said heated conveyor a plurality of vertical containers filled with carbonated beverage on an infeed conveyor by urging of a continuous stream of containers in tandem, said heated conveyor being substantially wider than said infeed conveyor, permitting said containers to spread out across said wide heated conveyor in a compact grouping, conveying said containers upon said heated conveyor over said flame heat source so that the heat emitted therefrom impinges upon the underside of said containers to thereby heat the carbonated beverage therein in progression proceeding from the bottom toward the top of the containers so that an elevation in the temperature of said beverage is induced while permitting the head space to remain relatively cool, and removing said containers on a discharge conveyor substantially narrower than said heated conveyor to permit fewer containers across said discharge conveyor.

2. A method as in claim 1 in which the flame heat source is an open gas flame which contacts the bottom of the containers.

3. A method as in claim 1 in which the flame heat source supplies a substantial degree of infrared type heat.

4. A method as in claim 1 in which said containers are metal cans.

5. A method as in claim 1 in which said containers are formed of glass.

6. A method as in claim 1 in which the temperature elevation is at a rate of at least ½° F. per second.

7. A method as in claim 1 in which the temperature elevation is from a first temperature range of about 38° F. to 48° F. to a second temperature range of 60° F. to 70° F. in order to avoid the formation of condensation on the containers.

8. A method as in claim 1 in which the beverage is beer and the temperature elevation is from a first temperature no greater than ambient room temperature value to a second value sufficient for pasteurization.

9. A method as in claim 8 in which the temperature elevation is at least about 92° F. and in a total time of less than 3 minutes.

10. A method as in claim 1 in which the beverage is heated from a plurality of flame heat sources.

11. A method as in claim 1 in which the average pressure in the containers leaving the flame heat source does not exceed the true carbonated pressure at a given temperature.

12. A method as in claim 1 in which the containers are vibrated to provide the conveying movement and to circulate the carbonated beverage within the containers to increase the heat transfer by convection from the bottom toward the top of the container.

References Cited
UNITED STATES PATENTS

| | | | |
|---|---|---|---|
| 1,863,222 | 6/1932 | Hoermann | 99—217 |
| 2,296,180 | 9/1942 | Pashkow | 99—214 X |
| 2,701,205 | 2/1955 | Ekelund | 99—214 |
| 2,771,645 | 11/1956 | Martin | 99—215 X |
| 3,071,478 | 1/1963 | Cheftel et al. | 99—214 |
| 3,272,636 | 9/1966 | Fehr et al. | 99—217 X |
| 3,494,723 | 2/1970 | Gray | 99—217 X |

NORMAN YUDKOFF, Primary Examiner

K. P. VAN WYCK, Assistant Examiner

U.S. Cl. X.R.

99—360; 426—407, 234

PO-1050
(5/69)

UNITED STATES PATENT OFFICE
CERTIFICATE OF CORRECTION

Patent No. 3,767,829          Dated October 23, 1973

Inventor(s)    F.A. Karr

It is certified that error appears in the above-identified patent and that said Letters Patent are hereby corrected as shown below:

Four (4) sheets of formal drawings certified for attachment to patent grant only.

Signed and sealed this 16th day of April 1974.

(SEAL)
Attest:

EDWARD M.FLETCHER,JR.              C. MARSHALL DANN
Attesting Officer                   Commissioner of Patents 3,767,829

4 Sheets-Sheet 1